US009043962B2

(12) United States Patent  
Trofe

(10) Patent No.: US 9,043,962 B2  
(45) Date of Patent: Jun. 2, 2015

(54) MODULAR SELF-SUSTAINING PLANTER SYSTEM

(71) Applicant: DANIELLE TROFE DESIGN, LLC, Brooklyn, NY (US)

(72) Inventor: Danielle Kirby Trofe, Brooklyn, NY (US)

(73) Assignee: DANIELLE TROFE DESIGN, LLC, Brooklyn, NY (US)

( * ) Notice: Subject to any disclaimer, the term of this patent is extended or adjusted under 35 U.S.C. 154(b) by 49 days.

(21) Appl. No.: 13/740,054

(22) Filed: Jan. 11, 2013

(65) Prior Publication Data

US 2013/0185997 A1 Jul. 25, 2013

Related U.S. Application Data

(60) Provisional application No. 61/586,522, filed on Jan. 13, 2012.

(51) Int. Cl.
*A01G 9/02* (2006.01)
*A01G 9/24* (2006.01)
*A01G 27/00* (2006.01)

(52) U.S. Cl.
CPC *A01G 9/247* (2013.01); *A01G 9/02* (2013.01); *A01G 9/023* (2013.01); *A01G 27/005* (2013.01)

(58) Field of Classification Search
USPC .......... 47/66.1, 66.5, 66.6, 79, 82, 83, 86, 39, 47/46, 47, 48.5, 67
See application file for complete search history.

(56) References Cited

U.S. PATENT DOCUMENTS

| | | | |
|---|---|---|---|
| 3,452,475 A | 7/1969 | Johnson, Sr. | 47/38 |
| 4,001,967 A | 1/1977 | Swift | 47/80 |
| 4,006,559 A * | 2/1977 | Carlyon, Jr. | 47/39 |
| 4,033,072 A | 7/1977 | Kobayashi | 47/62 |
| 4,056,897 A | 11/1977 | Pearce | 47/39 |
| 4,419,843 A | 12/1983 | Johnson, Sr. | 47/82 |
| 4,447,983 A | 5/1984 | Shinada | 47/48.5 |
| 4,951,416 A * | 8/1990 | Gutridge | 47/62 R |
| 5,251,399 A * | 10/1993 | Rasmussen | 47/39 |
| 5,385,590 A | 1/1995 | Sledge | 47/62 |
| 5,502,924 A | 4/1996 | Lee | 47/79 |
| 5,555,676 A | 9/1996 | Lund | 47/82 |
| 5,826,375 A | 10/1998 | Black | 47/67 |
| 6,615,542 B2 | 9/2003 | Ware | 47/83 |
| 7,516,574 B2 | 4/2009 | Gottlieb | 47/62 |
| 7,913,452 B1 * | 3/2011 | Imm | 47/83 |
| 8,418,403 B1 * | 4/2013 | Nuttman | 47/82 |
| 2010/0115837 A1 * | 5/2010 | Van Der Poel et al. | 47/66.6 |
| 2013/0145690 A1 * | 6/2013 | Cannon | 47/66.7 |

* cited by examiner

*Primary Examiner* — Rob Swiatek
*Assistant Examiner* — Lisa Tsang
(74) *Attorney, Agent, or Firm* — Winston & Strawn LLP

(57) ABSTRACT

A self-irrigating planter system that waters vegetation on a regular schedule using hollow upright supports to convey the water from a pump and reservoir to multiple organic-shaped pods that are attached to the upright supports in a tiered manner, and which uses gravity to deliver water so as to provide sustained plant growth and a healthier living environment with reduced energy usage.

17 Claims, 20 Drawing Sheets

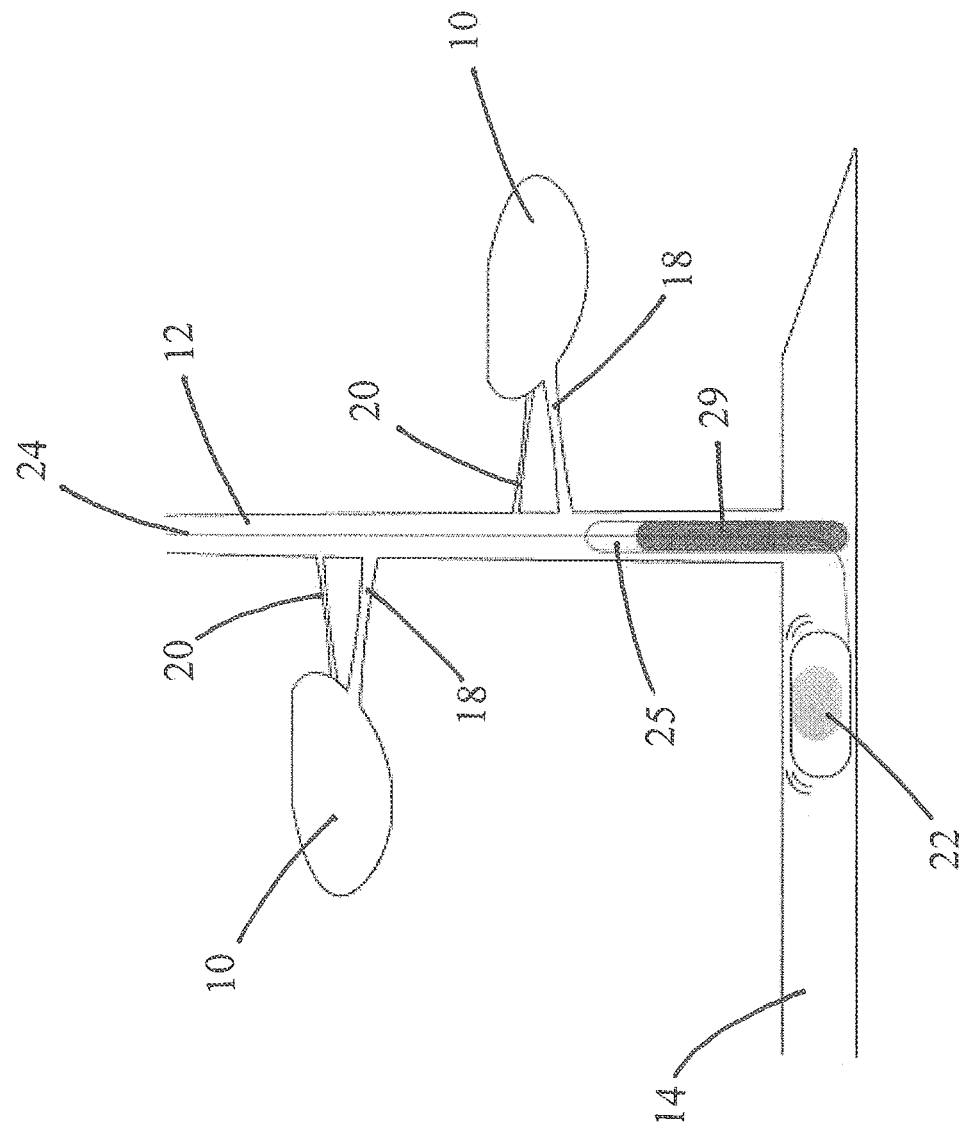

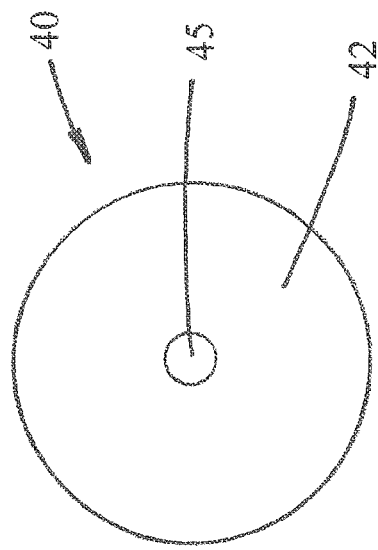
FIG. 12A
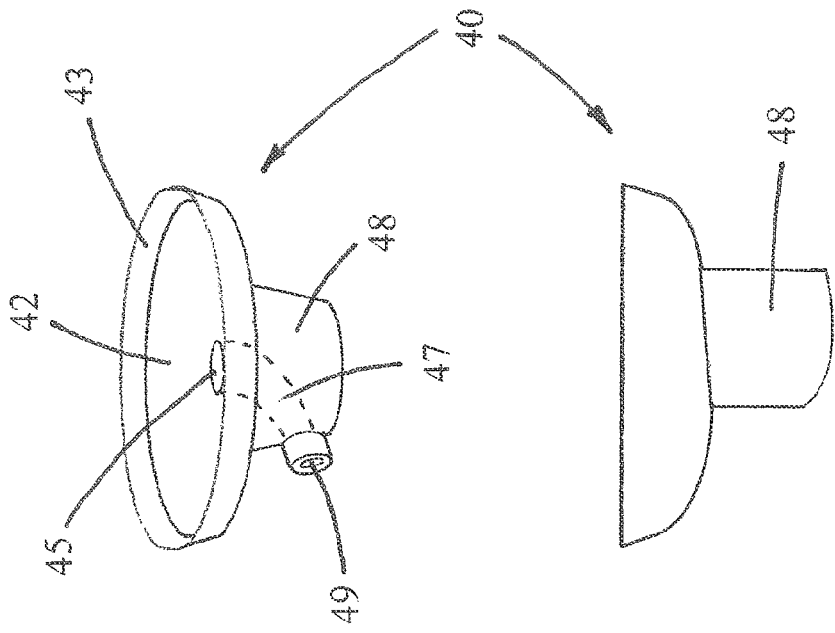
FIG. 12B
FIG. 12C
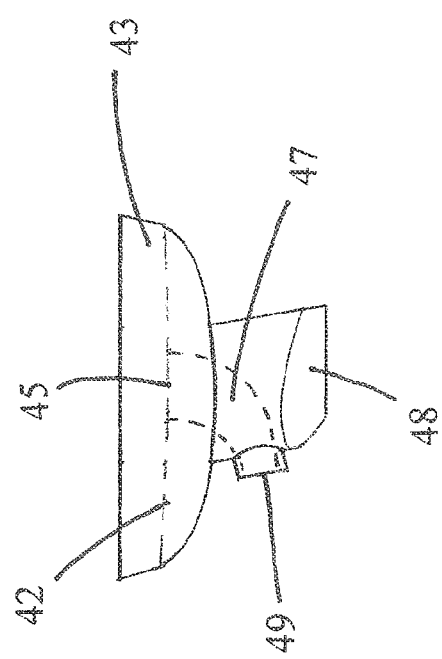
FIG. 12D

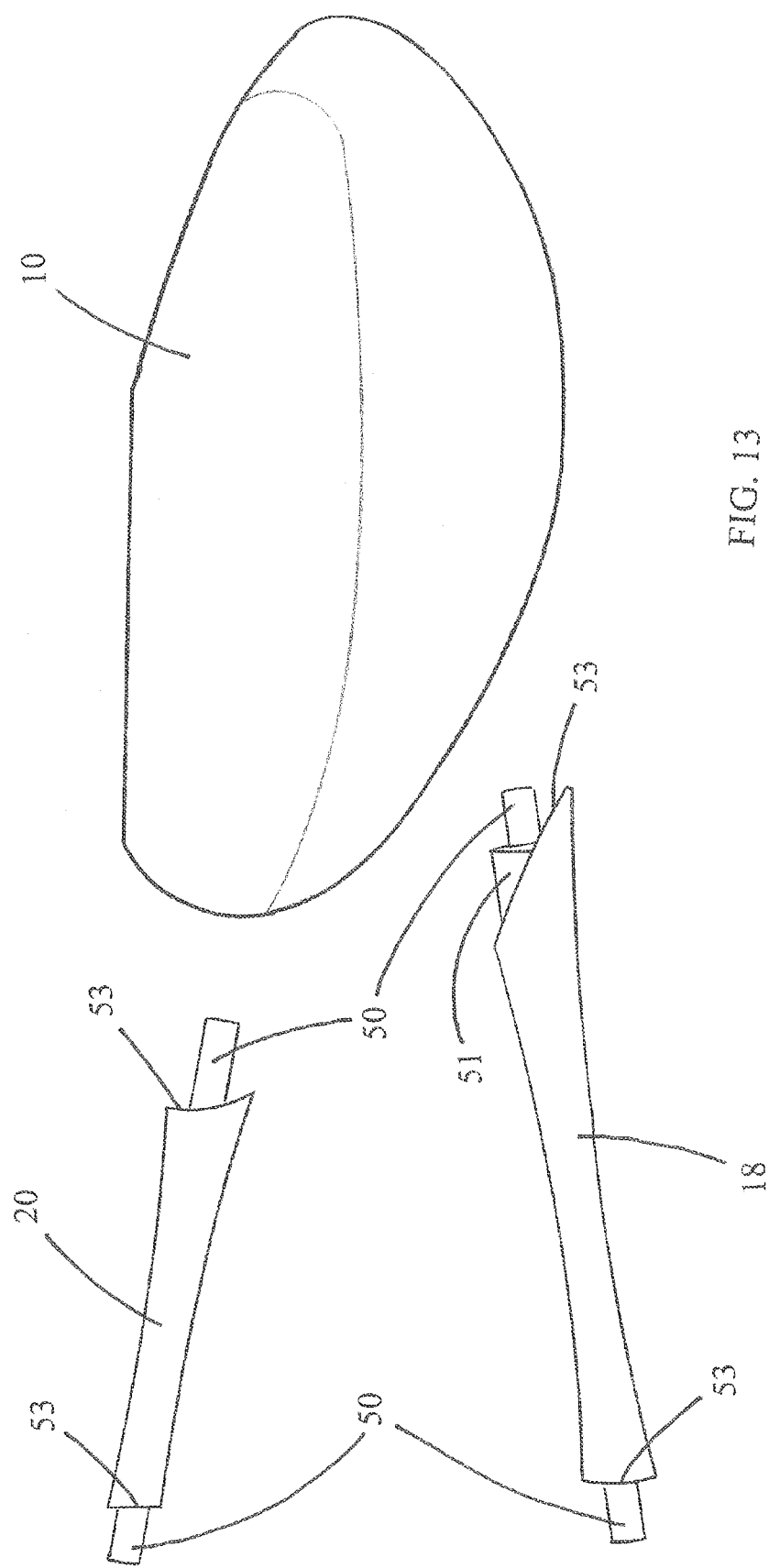

MODULAR SELF-SUSTAINING PLANTER SYSTEM

FIELD OF THE INVENTION

This invention relates to the field of planting systems and, in certain embodiments, to a sculptural, self-irrigating and self-sustaining vertical planter system.

BACKGROUND OF THE INVENTION

Living plants unquestionably improve most spaces and are particularly welcome in the home. However, many people struggle to care for plants and to find attractive and healthy locations for the plants. Remembering to water the plants on a schedule and with an appropriate amount of water is beyond the abilities of many people. Consequently, many people will either overwater their plants or provide too little water, and will damage or kill the plants as a result. Similarly, providing the appropriate amount of light for the plants can be difficult. As a result of these and other factors, many people simply refrain from having plants in their homes and places of work, even though they would enjoy plants if they could more easily manage them.

SUMMARY OF THE INVENTION

The principles of the present invention relate to a planter and plant irrigation system as described in the various embodiments. One or more of the non-limiting embodiments relate to a planter system comprising a base support, an elongated central support member fixed at one end to the base support, a plurality of individual pods, each pod being attached to the central support member via an upper hollow support bar and a lower hollow support bar, each upper support bar being angled downwardly from the central support member toward its respective pod, and each lower hollow support bar being angled upwardly from the central support member toward its respective pod, a fluid carrying tube connected between each of the upper hollow support bars and a fluid reservoir, and a pump connected to the tube to pump fluid from the reservoir through the tube to each of the upper support bars, such that fluid will flow through each of the upper support bars and enter each pod via its respective upper support bar; wherein fluid will flow from each pod through its respective tower support bar and to the reservoir.

The principles of the present invention also relate to having a long fluid carrying tube connecting the base fluid reservoir to the top upper hollow support bar, fluid carrying tubes connected between each of the lower hollow support bars to the next subsequent upper hollow support bars, a fluid carrying tube connects the lowest lower hollow support back to the water reservoir, an aquarium air pump pumps airflow through the water reservoir and into the long fluid carrying tube, thus propelling water and air up to the top upper hollow support, water will flow through each pod using gravity and then return back to the base reservoir.

Other non-limiting embodiments of the present invention relate to a plant irrigation systems comprising one or more upright support(s), wherein each of the one or more upright support(s) comprises a liquid-delivery conduit and a liquid-return conduit, one or more containers physically connected to the one or more upright supports, wherein the one or more container(s) is in liquid communication with the liquid-delivery conduit and the liquid-return conduit, a pump mechanism in liquid communication with the liquid-delivery conduit that delivers a liquid to each of the one or more containers through the delivery conduit and is supplied by liquid from the liquid-return conduit, wherein the top container of the one or more containers is supplied with a liquid/air mixture through the delivery conduit by an air pump.

The irrigation system can further comprise a base support attached to each of the one or more upright supports and in liquid communication with the liquid-delivery conduit and liquid-return conduit, wherein the base support comprises a liquid reservoir in liquid communication with the liquid pump mechanism and liquid-return conduit, such that the reservoir, pump and conduits form a re-circulating system. In another non-limiting embodiment, the base support connects to each subsequent upright support, which is in liquid/air communication with one or more attached planters to return the liquid/air to the reservoir using gravity, where the reservoir, pump, planters, and conduits form a re-circulating system.

Other non-limiting embodiments of the present invention relate to an irrigation system, wherein the one or more container(s) comprise a shell defining a three-dimensional space, an opening in an upper surface of the shell, and an internal volume that is configured and dimensioned to contain living plants, wherein the container acts as a planter for holding and maintaining live plants, and the internal volume of the container(s) is in liquid communication with the liquid-delivery conduit and the liquid-return conduit, such that liquid can be delivered to a living plant within the internal volume of each of the one or more containers. Each of the container(s) may be a pod having a spherical, ellipsoid, or ovoid shape.

The irrigation system can further comprises container(s) having a second opening in the lower surface of the shell, a partition that divides the internal volume into an upper section that is accessible by the opening in the upper surface, and a lower section that is accessible by the opening in the lower surface, such that the upper and lower sections are isolated from each other, and a light fixture mounted within the tower section that can illuminate a container located below the lower opening. The light source electrically connected to the light fixture may be a grow light that provides radiation necessary for plants to grow below the grow light.

In yet another embodiment, a drain cup fixture attaches within the pod to the upper and lower hollow supports, thus supporting the net that holds the plants roots and also allows for proper fluid drainage back into the tower support and continues the fluid circulation.

Other non-limiting embodiments of the present invention relate to an irrigation system, wherein the container(s) are cantilevered away from the support and physically connected by at least one extension arm to the support.

The upright support may be a straight, hollow, vertical column.

In other non-limiting embodiments, an extension arm or member is physically connected to the support by a collar configured and dimensioned to freely rotate around the long axis of the vertical support, where the collar has an inner diameter that fits with and encircles at least a portion of an upright support, an outer diameter that approximately equal to the outer diameter of the upright support, and an opening that provides fluid communication between the extension arm and fluid conduits, or allows passage of tubing from a planter to the interior space of an upright support.

The container(s) may be physically connected to the support by an upper extension arm or member and a lower extension arm or member, and wherein the upper extension arm is in fluid communication with the liquid-delivery conduit and the lower extension arm is in fluid communication with the liquid-return conduit. In some embodiments, the extension arm may be a single molded component comprising two hollow channels for connection to a liquid delivery conduit and a liquid return conduit.

In some non-limiting embodiments, the straight, vertical column tapers from a larger diameter at the attachment to the base to a smaller diameter at the free end.

In some non-limiting embodiments, the liquid-delivery conduit comprises plastic tubing running along the interior of each of the one or more supports, and the return conduit comprises the annular space between the tubing and the interior walls of the support. In other non-limiting embodiments, the upright support comprises a hollow tube that is partitioned internally into a liquid-delivery conduit and a liquid-return conduit, and the liquid pump mechanism generates a pressure head sufficient to raise the water level within the liquid-delivery conduit at least to the height necessary to deliver a liquid to the highest container in liquid communication with the liquid-delivery conduit. The liquid pump mechanism may be a pump designed to directly propel the liquid, including but not limited to, a reciprocating pump, a peristaltic pump, an impeller pump, or a centrifugal pump, as would be known in the art. The liquid pump mechanism may also be a pump designed to indirectly propel the liquid using air bubbles or other forms of entrainment, including but not limited to an aquarium air pump or a venturi/ejector pump, as would be known in the art. The liquid pump mechanism provides sufficient force to deliver the irrigating liquid to the container farthest up the support and/or farthest away from the pump and/or reservoir.

In some non-limiting embodiments, each of a plurality of upright supports is physically connected to the base support, and each upright support has a separate liquid pump mechanism in fluid communication with the common liquid reservoir and the liquid-delivery conduit.

In other non-limiting embodiments, the upright support bends in alternate directions to form a zigzag pattern, and the one or more containers are physically connected to the upright support at the vertices of each bend.

In some non-limiting embodiments, a drip ring is located within the internal volume of the container and in liquid communication with the liquid delivery conduit, such that the drip ring disperses the irrigating liquid more evenly throughout the internal volume and planting material.

In some non-limiting embodiments, a drain cup is located within the internal volume of the container and in fluid communication with the liquid delivery conduit and the liquid return conduit, so the irrigating liquid can be communicated from the liquid delivery conduit to the planting material, and collected by the drain cup and communicated to the liquid return conduit.

The principles of the present invention relate to hydroponic planting materials being placed within the internal volume of the container or the drain cup, for example, expanded clay pellets, lava rocks and coconut husks can be use in place of dirt or potting soil within the planters.

In other non-limiting embodiments, at least two upright supports are attached to the same base, the at least two upright supports comprise hollow tubes, and at least one pair of the at least two upright supports intertwine to form a double helix.

The principles of the present invention also relate to a method of irrigating plants comprising providing a plurality of containers attached to an upright support, placing live plants into one or more of the containers, delivering an irrigating liquid in parallel to each of the plurality of containers through a liquid-delivery conduit with branches to each container, draining excess liquid from each of the plurality of containers into a common liquid return conduit, and recycling the excess irrigation liquid for subsequent delivery to the plurality of containers.

The principles of the present invention also relate to a method of irrigating plants with reduced energy consumption comprising providing a plurality of containers attached to an elongated upright support, placing live plants into one or more of the containers, delivering an irrigating liquid to the container positioned at the highest point on the support through a liquid-delivery conduit, draining excess liquid from the highest container into a liquid return conduit, channeling the excess liquid to the next lower container under the force of gravity, and from that container into the next lower container until all of the containers have been irrigated, and recycling the excess irrigation liquid for subsequent delivery to the highest container to form a closed circulating loop.

BRIEF DESCRIPTION OF THE DRAWINGS

The above features and other advantages of the various embodiments of the present invention will become better understood by reference to the following non-illustrated examples depicted in the accompanying drawings wherein:

FIGS. 3A-B illustrate two of the planter pods of FIG. 1 and illustrates a possible position of a pump used to facilitate water flow.

FIGS. 12A-D illustrate different views of an embodiment of a drain cup.

FIG. 13 illustrates an embodiment of a pod and separate upper and lower support members.

The same reference number refers to the same part in each of the different drawings.

DETAILED DESCRIPTION OF THE INVENTION

Figure 1:
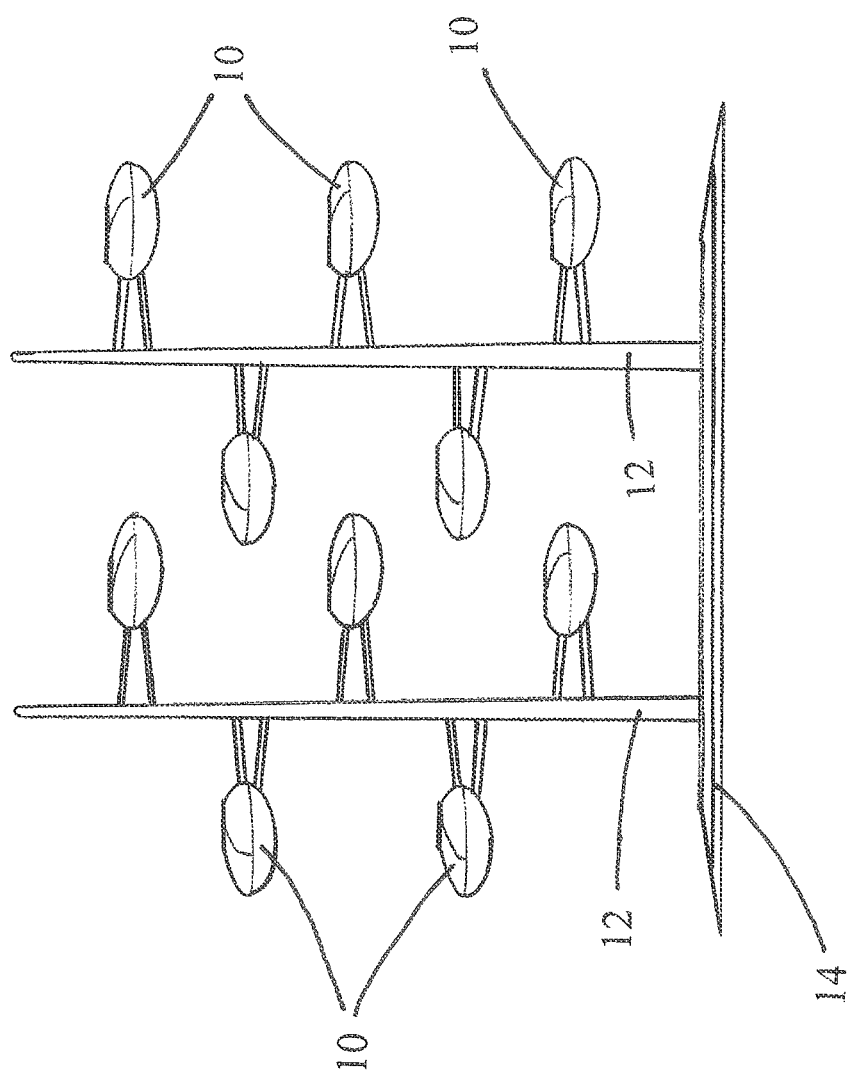
FIG. 1 is a side view of a planter system in accordance with an embodiment of the invention.

The principles of the present invention relate to a self-irrigating planter system that comprises plant-holding containers attached to an upright support and interconnected to a liquid delivery system.

As used herein, the "bottom," when use in reference to an upright support is intended to refer to the end of such support positioned in a base and/or located closest to a floor or other horizontal supporting surface when arranged in its intended upright, vertical orientation. The term "bottom" or "lower," when used in reference to other components, is intended to refer to a face, surface, or end directed downward towards a floor, base, or other horizontal supporting surface when such components are arranged in their intended orientation and/or attached to an upright support, for example in the case of pods.

As used herein, the term "top," when use in reference to an upright support is intended to refer to the end of such support located farthest from a floor, base, or other horizontal supporting surface when the support is arranged in its intended upright, vertical orientation. The term "top" or "upper," when used in reference to other components, is intended to refer to a face, surface, or end directed upwards away from the floor, base, or other horizontal supporting surface when such components are arranged in their intended orientation and/or attached to an upright support, for example in the case of pods.

As use herein, the term "highest," is intended to refer to a location or position situated farthest from a floor, base, or other horizontal supporting surface when the support is arranged in its intended upright orientation. The term "highest," when used in reference to an arrangement of components is intended to refer to the component situated above all other similar components or closest to the top of a support when such components are arranged in their intended positions and orientations and/or attached to an upright support, for example in the case of pods.

As use herein, the term "lowest," is intended to refer to a location or position situated closest to a floor, base, or other horizontal supporting surface when the support is arranged in its intended upright orientation. The term "lowest," when used in reference to an arrangement of components is intended to refer to the component situated below all other similar components or closest to the bottom of a support when such components are arranged in their intended positions and orientations and/or attached to an upright support, for example in the case of pods.

The principles of the present invention relate to a stand-alone, essentially vertical, structure comprising tiered pods that create a vertical garden of live domestic vegetation. The principles of the present invention further relate to a modular and movable structure that can comprise one or more of the vertical supports affixed to different sized bases and two or more bases that can be connected in a modular manner. The principles of the present invention further relate to a soilless system that can utilize expanded clay pellets, lava rocks and coconut husks in place of dirt or potting soil within the planters.

Non-limiting embodiments of the self-irrigating planter system comprise one or more elongated, upright supports that uphold the one or more containers. In an embodiment of the present invention, the upright support is a straight, hollow, tapered pole. The end of the tapered pole having a larger diameter is preferably affixed to a base or placed upon a floor or other horizontal supporting surface, while the end of the pole having a smaller diameter is unsupported, so that each upright support is free-standing without connections or bracing to any other upright supports. In other embodiments, the smaller diameter ends may be interconnected and supported by a horizontal cross-member to provide added rigidity and strength. Such a horizontal cross-member may be configured and dimensioned to be affixed to a ceiling or wall of a room. The top of a support may also be placed in contact with a ceiling to anchor both ends of the support for example through friction with the contacted surface. Rubber feet or caps may be attached to the top and/or bottom ends of a support to protect the contacted surfaces and provide improved resistance to movement.

In another embodiment, the upright support may alternately bend in opposite directions to form a zigzag or serpentine pattern within one plane, or may bend in different directions to form a three-dimensional geometric pattern, such as a triangle, square, pentagon, etc., when viewed along its axis of propagation.

In yet another embodiment, the elongated, upright support may have a smooth three-dimensional curve to form a helix or corkscrew pattern, or two curved upright supports may intertwine to form a double helix pattern.

In some non-limiting embodiments, the elongated, upright support(s) comprise one or more connection points that facilitate the physical attachment and operative association of the planters with the upright support. An upright support preferably has between one and twelve connection points, and more preferably has between 5 and 9 connection points, and most preferably has 7 connection points. The connection points may be located on alternating sides of the support to create a staggered vertical arrangement of planters.

In some non-limiting embodiments, a planter may be semi-permanently connected to a connection point, by methods known in the art such as welding, soldering, brazing, epoxying, press-fitting, or a combination, or may be removably connected to a connection point by methods known in the art, such as by push-fitting, annular snap rings, cantilevered snaps, or barbs, or a combination. Connection of a planter to the upright support places the planter in liquid communication with a liquid-delivery conduit and a liquid return conduit. Once physically attached, the planter is in flow communication with a pump mechanism associated with the upright support, which delivers irrigating liquid to the planter, and a liquid reservoir.

The connection points may be two vertically arranged openings, wherein a higher opening is connected to and in fluid communication with a liquid delivery conduit and a lower opening is connected to and in fluid communication with a liquid return conduit. The openings may be configured and dimensioned to receive an annular connector of a support arm, which may provide both mechanical connection and support for a planter to the upright support, as well as forms a fluid connection between the support arm and a liquid conduit. Additional openings may be provide to allow additional mechanical connections for screws, cantilevered snaps, or pins to prevent rotation, as well as openings for electrical wiring running from a planter to the hollow interior of an upright support.

In an embodiment, the elongated, upright support(s) can comprise multiple sections that may be assembled into a complete support of a varying number of support members to achieve varying heights. Each section may have a first end having a first outside diameter and a first inside diameter and a second end having a second outside diameter and a second inside diameter, and a step between the first and second outside diameters, where the second outside diameter is less than the first inside diameter so multiple ends of the sections of a support can be assembled in a telescoping manner.

The upright support are formed in segments such that when the segments are joined in a telescoping manner they may be rotated relative to each other, so that connection points along different support segments may be faced in different directions.

In another embodiment, a coupling portion of a member can be configured and dimensioned to have a first and a second outside diameter, where the second outside diameter is less than the first outside diameter to form a recessed section. An opening is cut circumferentially around a portion of the recessed section to allow passage of tubing through the opening. A cylindrical collar having an outside diameter that is the same as the first outside diameter and an inside diameter that is larger than the second outside diameter can be placed around the recessed section of the coupling member to form a pivoting or rotating segment that allows an attached container to be positioned at different angles around the upright support. In an embodiment, the hollow extension members are connected to the cylindrical collar such that tubing forming the liquid delivery conduit and liquid return conduit can pass from the elongated, upright support through a hollow extension member into the internal volume of a planter to deliver the irrigating liquid to a plant.

In some non-limiting embodiments, a container also referred to as a planter is a three-dimensional shell having an interior three-dimensional volume and an outer surface. The planter may be an ovoid or egg-shaped component having an opening in an upper portion of the shell sufficient to accept a plant, however other shapes such as cylinders, ellipsoids, and spheres are also contemplated within the scope of the invention. An ovoid or ellipsoid planter is also referred to as a pod. The interior volume of a container may contain a planting material including but not limited to potting soil, or more preferably expanded clay pellets, lava rocks and/or coconut husks so the planter operates as a hydroponic system. In another embodiment, the container has two openings, where a first opening is in the upper surface of the shell, and a second opening is in the lower surface of the shell. The upper surface opening allows vegetation and potting material to be inserted into the planter, whereas the lower opening allows illumination from a light source to be directed downwards onto vegetation positioned below the planter, or to add to the lighting in a room in which the irrigating system is located. The light source may be a grow light to provide additional light to the plants if the ambient or natural light is insufficient for a plant to grow. The light source may also be light-emitting diodes (LEDs) of varying colors to provide accent lighting to a room while maintaining lower energy usage. In embodiments, the planter is constructed of two parts with a horizontal seam around the circumference of the planter and joining the upper part to the lower part. A hinge located at a point around the circumference of the planter joins the upper part and the lower part in a manner that allows the two parts to be separated and achieve access to the internal volume of the planter.

In an embodiment of the container having an opening in the lower surface, the container would further comprise a partition separating an upper portion of the container holding the plant and soil from a lower portion containing the wiring, electrical fixtures and light source. The divider or partition forms a liquid-tight seal between the upper compartment and the lower compartment to prevent the leakage of the irrigating liquid out of the lower opening, and to prevent any electrical or lighting components from getting wet, shorting out, or creating other hazards. In an embodiment, the partition may have a depressed portion that forms a basin for holding a predetermined amount of irrigating liquid before excess liquid exits the container through an opening to the liquid-return conduit. The divider or partition may be angled towards the outlet of the container to direct excess liquid to a lower extension member, if present, and the return conduit.

In another embodiment, a drain cup is placed within the inner volume to hold a plant and planting material, and may provide a partition between an upper portion of the container holding the plant and planting material from a lower portion containing the wiring, electrical fixtures and light source.

In an embodiment, a drain cup comprises a disk with an outer rim around its circumference and an opening located approximately in the center of the disk, wherein the disk's upper surface may slope downward from the outer rim to the opening to funnel liquid to the opening and provide drainage. A screen may be placed within the opening to prevent potting material from clogging the opening. In another embodiment, a drainage spout extends outward from the bottom surface of the drainage disk around the opening, and further comprises a conduit that channels liquid entering the opening in the upper disk surface to a conduit in an extension arm and/or the upright support. The drainage spout may be configured and dimensioned to position and support the drain cup within a planter. The drainage spout is preferably cylindrical in shape with a bottom face that is contoured to match the inner bottom surface of a planter, although other shapes are contemplated and fall within the scope of the invention.

In an embodiment, the wiring runs within a separate liquid-tight electrical conduit, which prevents penetration by the irrigating liquid to the electrical components and avoids shorts, shocks, and other hazards known to those having skill in the art of wiring in wet or submerged environments.

The container(s) may be cantilevered away from the upright support with extension members. In some embodiments, the extension members may be hollow support bars having a cross-sectional shape and a through-hole for conveying a liquid or passing tubing of a smaller diameter than the hole.

In another embodiment, the containers may be attached directly to the upright support connection point without extension arm(s). In the various embodiments, one or more containers may be attached to an upright support depending upon the user's preference, the amount of space available to attach containers to the support, and the number of locations providing connection to a liquid-delivery conduit and a liquid-return conduit. As an illustrative example, an upright support may be configured with 11 container connection points, however a user might only attach 5 containers to 5 of the connection points due to the size of the plants, and cap the remaining 6 connection points to prevent leakage of the irrigation liquid.

In other non-limiting embodiments, a liquid-delivery conduit communicates irrigating liquid from a reservoir to the one or more containers. The liquid-delivery conduit may be tubing contained within an interior portion of an upright support. The tubing may be a single length of plastic tubing extending up to the highest container. In another embodiment, the tubing may extend between T-couplings, each of which creates a branching point for each container. The tubing and T-couplings deliver irrigation fluid to each of the containers in parallel.

In another embodiment, plastic tubing connects each bottom hollow support with the next pod's top hollow support.

In some non-limiting embodiments, a drip ring may be connected to and in fluid communication with a liquid-delivery conduit to disperse the delivered liquid around the roots of the vegetation and throughout the volume of material within the planter.

A liquid-return conduit communicates an irrigating liquid from the one or more of the planters back to a liquid reservoir. In one embodiment, the liquid-return conduit connects a liquid outlet opening of one planter positioned higher on the upright support with a liquid inlet opening of a planter positioned lower on the upright support, where each of the plurality of tower planters is connected in the same manner in series. A pump mechanism pumps the irrigating liquid to the inlet of the highest mounted container through the deliver conduit. Gravity is used to bring excess liquid from the highest mounted container to each of the subsequently lower containers, and eventually return any residual liquid back to a liquid reservoir for recirculation by the pump mechanism. The liquid-return conduit may be the annular space between the interior surface of the elongated upright support and the tubing forming the liquid-delivery conduit.

In another embodiment, the liquid-return conduit may be tubing separate from the liquid delivery tubing that runs parallel with the liquid-delivery tubing within the hollow interior of an upright support. The liquid-return conduit may also be a plurality of separate tubing sections that interconnect each of the plurality of planters attached to a support, and a separate section of tubing communicates excess liquid from an outlet of a higher planter to the inlet of a lower planter under the force of gravity.

The irrigating liquid is preferably water, however water containing fertilizer or plant food, or a liquid plant food is also contemplated within the scope of the invention.

In some non-limiting embodiments, an air pump mechanism is employed to force an irrigating liquid up to the top container mounted on the upright support against the force of gravity using air bubbles. An air pump mechanism can provide sufficient force to deliver the irrigating liquid to the highest mounted planter.

In an embodiment, a pump mechanism is associated with and in electrical communication with a controller that can set the rate the pump delivers liquid and/or the time period(s) that the pump is actively pumping liquid, so that the amount, timing, and duration of liquid delivered to the planter(s) may be suitably controlled based upon the requirements of the particular plants growing in the containers. For example, a pump may be set to continuously deliver the irrigating liquid at a slow rate to maintain a very moist growing condition, or to deliver a very limited amount of liquid only one or twice a day to plants requiring a dry growing condition, such as for cactuses.

In an embodiment, a pump mechanism is associated with each upright support to provide independent liquid delivery to the planters associated with the particular support. The pump mechanism may be a submersible pump housed within the lower portion of the hollow upright support with which it is associated. The pump mechanism is in fluid communication with both a fluid delivery conduit and a fluid source, such as a tank or reservoir that provides a sufficient supply of irrigating liquid. The use of separate pump mechanisms housed within each support and having individual controls allows individual control of the amount of liquid pumped through the particular liquid delivery conduit. For example, the pump mechanism may be set to deliver 5 milliliters/minute for 10 minutes every 4 hours. As another illustrative example, a pump may be set to deliver 5 milliliters/minute for 20 minutes once a day in the morning.

In another embodiment, an air pump mechanism is associated with delivering water to the top planter upright support. The pump mechanism may be an aquarium air pump that forces air into a tube that is fed through a cylindrical water reservoir located inside the base of the upright pole. A t-valve allows water to enter the air tube and thus propel the liquid up through the larger tube to the top planter support.

In another embodiment, one or more planters may further comprise a moisture sensor that can trigger the operation of the pump mechanism when a predetermined moisture level is detected. In yet another embodiment, the pump controller can be set to deliver a set volume of water per day at a set rate instead of over a fixed period of time.

In another embodiment, a single pump mechanism of suitable size may be associated with a base and liquid reservoir, and configured and dimensioned to be couple to one or more liquid-delivery conduits through a liquid manifold. The single pump mechanism associated with the base would also preferably be a submersible pump located with the tank or reservoir, an air pump rests within the base and connects to up to four air tubes which would have sufficient power to deliver liquid to the top of each upright support attached to the base.

In non-limiting embodiments, a base to which the one or more upright supports can be attached is intended to provide structural support to the upright support(s) and increased liquid-holding capacity. The base may be a rectangular prism that is different sizes to fit in different sized areas and rooms, and along different sized walls. Separate bases may be arranged in a modular system that allows multiple bases, which can be the same or different sizes, to be interconnected. The bases may be arranged to form different shapes, for example an 'L,' around a bend or in a corner of a room. In a non-limiting embodiment, the base has a hollow interior volume that forms the reservoir for containing the irrigating liquid, and provides a single source of liquid to the one or more pump mechanisms. In another embodiment, the hollow interior volume of the upright-support below the bottom-most planter forms the reservoir for containing the irrigating liquid for that support. An air pump and tubing may provide power air lift to each water reservoir in the base of each upright support. In another embodiment, the reservoir is a separate liquid holding tank that may be enclosed within the base. In another embodiment, an enclosed tank may be accessed through a separate opening in the base. In an embodiment, the reservoir is a separate liquid holding tank enclosed within the hollow interior volume of the upright-support below the bottom-most planter.

In yet another embodiment, a base may further comprise one or more light sources, wherein the light sources may be upwardly directed to illuminate the bottoms of the planters and provide lighting to the room or area in which the system is located. The light source in the base is preferably a strip or bar of LEDs, although incandescent and florescent lights may be used. In an embodiment comprising both a reservoir and a LED bar, liquid is preferably added to the reservoir in the base by lifting the LED bar. The base is preferably made of powder coated aluminum, coated steel, stainless steel, ceramic, plastic, resin, or a combination of the materials. The base should be resistant to rust and corrosion, and provide a safe, durable, and aesthetically pleasing appearance.

In some non-limiting embodiments, one or more reservoirs may be provided to hold a sufficient amount of irrigating liquid for prolonged operation of the irrigating system. The reservoirs may be provided within abuse and is in fluid communication with each pump mechanism attached to the base. The reservoir may be the interior volume of the pole bases made of a non-corroding material, cylindrical in shape, or the reservoir may be a plastic tank placed within the base.

In another embodiment, when a support is not attached to a base or the base does not comprise a reservoir, can form a smaller volume reservoir for the submersible pump housed within the support by closing the bottom of the support with a liquid-tight cap or cover. An initial amount of liquid can be introduced to the planter/support assembly through one of the planters, where the excess liquid would then collect within the bottom portion of the upright support and circulated by the pump through the conduits, or by opening a panel or door in the upright support.

In one embodiment, one or more upright supports may be attached to a base in a modular manner, thereby allowing a user to modify the overall size of the irrigating system by selecting from different sized bases and selecting a different number of upright support(s) to be attached to a base. Since each upright support may house its own pumping mechanism, each upright support and container assembly could be independent of all other support/container assemblies, and the pump in each of the supports can be set to deliver different amounts of liquid with its associated controller. In another embodiment, different planters may be mounted to the same upright support, where some planters have a light source containing a grow light to augment the natural lighting and other planters lack a lower opening or contain a different light source. In this manner, different types of plants can be grown in different planters on each support, and a variety of different plants requiring different irrigation and lighting conditions can be grown using the modular system.

In some non-limiting embodiments, an extension member may be used to connect a planter to an upright support in a cantilevered manner, so the planter is not directly attached to an upright support. In one embodiment, an extension member comprises a hollow rod or bar through which liquid or tubing may pass. Two extension members may be utilized to uphold a planter in a cantilevered manner away from an upright support. In other embodiments, a single extension member having two fluid passages may take the place of the two separate extension members. The two extension members can be attached to a side of a planter such that a first extension member is attached above and in vertical alignment with the second extension member, where the first extension member is angled upwardly away from the planter and the second extension member is angled downwardly away from the planter. This arrangement of hollow extension members allows liquid to flow into a planter along the upper extension member under the force of gravity, and excess liquid to flow out of the lower extension arm under the force of gravity. In this embodiment, the upper extension member of each planter, except the highest-positioned planter, is in liquid communication with the liquid-return conduit. The upper extension arm of the highest-positioned planter is in fluid communication with the liquid-delivery conduit. In another embodiment, the single extension member has an upper hollow passage and a lower hollow passage, where the arrangement of hollow passages allows liquid to flow through the extension member into a planter along the upper hollow passage under the force of gravity, and excess liquid to flow out of the lower hollow passage under the force of gravity.

In some non-limiting embodiments, integrated lighting may be added to the base, upright supports, planters, and horizontal cross-member to provide ambient lighting to the room or area in which the irrigation system is located, or to provide grow lights to augment the natural lighting, where the natural lighting may be insufficient to grow the desired species of vegetation. The light sources may comprise sockets or fixtures for incandescent or fluorescent light bulbs, LED bulbs, strips, strands, or bars, halogen bulbs, or other light sources known in the art. In an embodiment, a horizontal cross-member attached to the tops of the upright supports may comprise electrical connections for track-lighting or LEDs.

As a non-limiting example, upright supports comprising hollow tapered poles are secured to a base and uphold two or more planters. The planters are connected to the tapered poles in a cantilevered manner by two extension members that angle upwardly and downwardly away from the planter to form a triangular opening between the extension members and the support. A submersible pump is housed at the bottom of each upright support that pumps water up to the highest planter, where gravity then carries the water downward to each of the lower planters in sequence leaving behind a sufficient amount of water at the base of each plants' roots. Each pump can be timer activated, so the plants are irrigated based on their needs. The pump may be connected to one open end of plastic tubing and the opposite open end of the tubing may be attached to a larger vertical tube with an opening to allow water to enter the air tubes, to the highest planter and direct the water flow through the interior of the hollow tapered pole. Additional plastic tubing is used to connect the downwardly-angled hollow extension of a higher planter to the upwardly-angled hollow extension of each successively lower planter to allow gravity to bring the water to each of the lower planters. A mesh grate placed at the outlet opening can help restrict the water flow out of each planter, and prevent soil, debris, and/or roots from clogging the exit opening in a planter shell.

Examples of different embodiments of each of the various components as well as different embodiments of the overall irrigation system will now be described in more detail with reference to the figures. It should be understood that these drawings only illustrate some of the possible embodiments, and do not represent the full scope of the present invention for which reference should be made to the accompanying claims.

Referring to FIG. 1, an embodiment of the invention features a plurality of individual sculptural pods 10, each attached to one of the tapered vertical columns 12. Two of the columns 12 are shown being supported by a single base 14. However, in some embodiments abuse may support a single column, whereas in other embodiments multiple columns may be supported by a single base.

Figure 2:
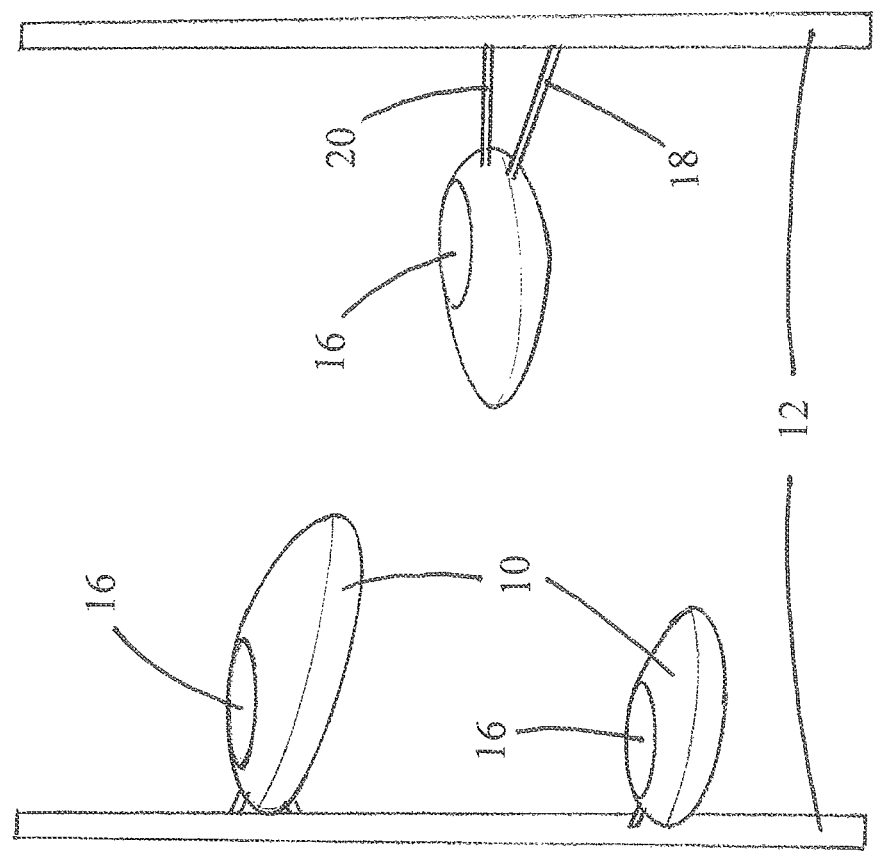
FIG. 2 is a perspective view of some planting pods shown in FIG. 1.

FIG. 2 is a perspective view of certain of the pods 10 of FIG. 1. Each pod has an upper opening 16 to receive a plant, and is attached to column 12 via a pair of hollow support tubes 18, 20. The hollow support tubes 18, 20 may provide a passage for the flow of the irrigating liquid or a plastic tube that carries the irrigating liquid. The pods may be the same size and shape, or different sizes and shapes to accommodate different plants.

Figure 3A:
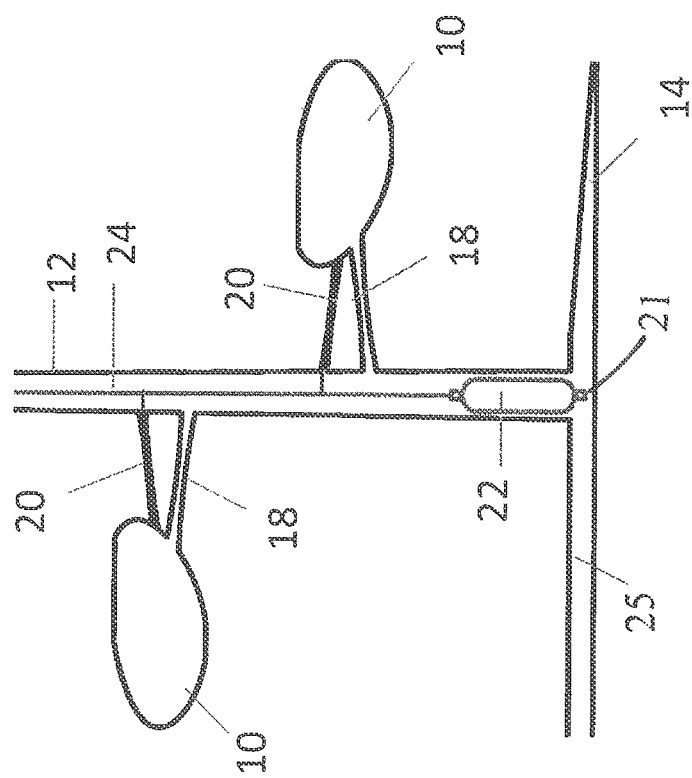

FIG. 3A illustrates an embodiment the invention relating to the flow of water through one of the hollow upright supports 12, which can be a vertical column. Water can be pumped up upright support 12 by a pump mechanism 22 via a tube 24 attached to the pump 22 and into the upper support arm 20 of each pod 10 to provide moisture to the plant in each pod. Water will drain out of each pod 10 through lower support arm 18 and flow down the hollow interior of upright support 12, around pump 22, and into a reservoir tank 25 in base 14. An inlet 21 to the pump 22 may be submerged in the tank 25. The operation of pump 22 is preferably controlled by a suitable electronic controller (not shown) that can be programmed to teed water to the system at scheduled times and either for a defined period of time or a defined volume of water, as discussed above. Alternatively, one or more pods 10 can include a moisture sensor that can trigger the operation of pump 22 when a predetermined moisture level is detected. Reservoir 25 can be filled through an opening (not shown) in base 14 or can be fed by a water source, such as a water feed from an outside rain collector (e.g., a house gutter system) or via the building water line.

FIG. 3B illustrates another embodiment of the invention having an irrigating liquid reservoir 25 in the bottom section of a hollow upright support 12, which may be a straight or curved support above the illustrated bottom section, and a pump mechanism 22 located in the base 14 of the planter irrigation system, wherein the pump mechanism 22 can be an air pump that delivers air bubbles into a tube 24 in fluid communication with the liquid 29 in the reservoir 25. The air bubbles enter the tube at a T-coupling or venturi connection (not shown) and entrain the irrigating liquid 29 to move it up the tube forming a delivery conduit to pods 10, or the entrained irrigating liquid may be delivered to the highest planter attached to the support (not shown).

Figure 4A:
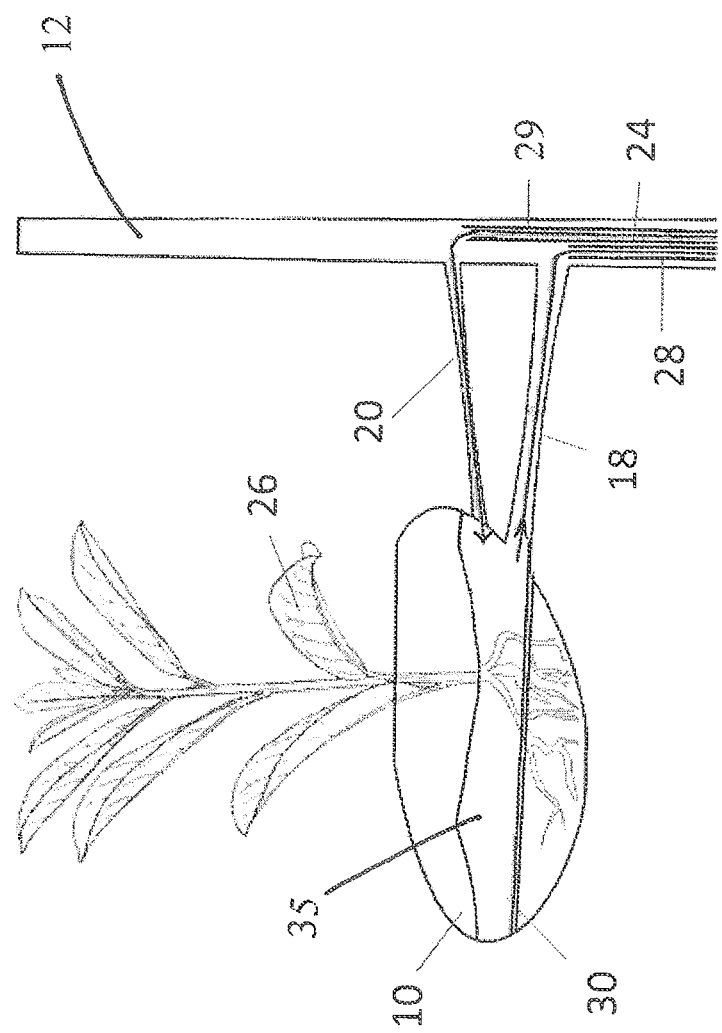
FIGS. 4A-B are a cross-section showing one of the pods of FIG. 1 containing a plant and illustrating the flow of water through the pod.

FIG. 4A further illustrates the water flow through a single pod 10 containing a plant 26 and planting material 35. Irrigating fluid 29, which may be water, flows up through tube 24 as noted above and into the upper support arm 20. The water then flows down into the soil contained within pod 10, which may be the highest pod attached to support 12. As the water seeps down through the soil, excess water is diverted toward lower support arm 18 by an angled diverter 30, and then flows down through vertical column 12 via a return tube 28. Tube 28 may be connected to upper support arm 20 of the next lower pod (not shown). As an alternative to using a return tube 28 the water may flow in the hollow interior of vertical column 12 back down to a reservoir in the support or base.

Figure 4B:
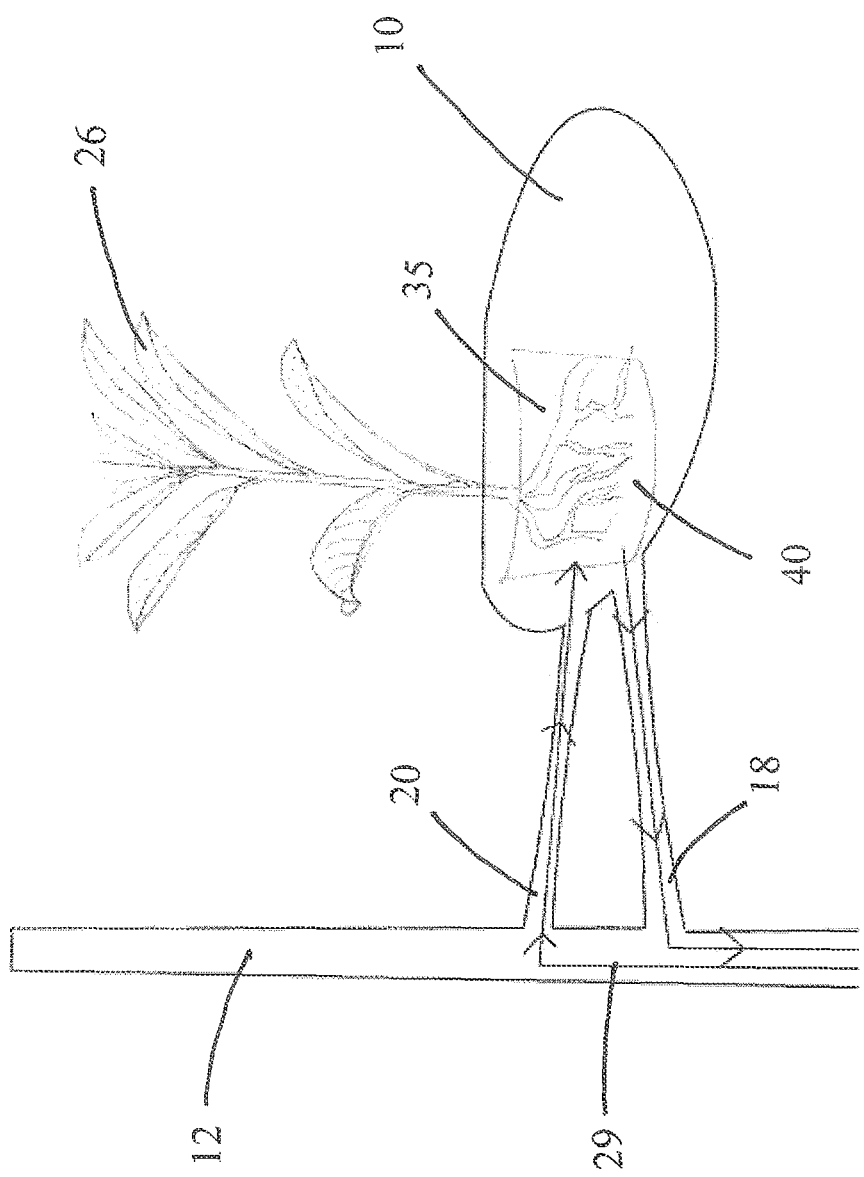

FIG. 4B illustrates the irrigating liquid 29 being fed up the inside of the top section of an upright support 12 to the highest planter 10 and returned down the inside of the support, where the irrigating liquid may be contained in delivery and return conduits within the support 12. The irrigating liquid, which may be water, flows up the delivery conduit and through the hollow interior of the upper support arm 20 to the drain cup 40 holding the planting material 35 and plant 26. The irrigating liquid 29 is fed into the interior volume of the drain cup 40 through an opening, and excess liquid is collected in the bottom of the drain cup 40 and flows out of the lower support arm 18 to the return conduit.

Figure 5:
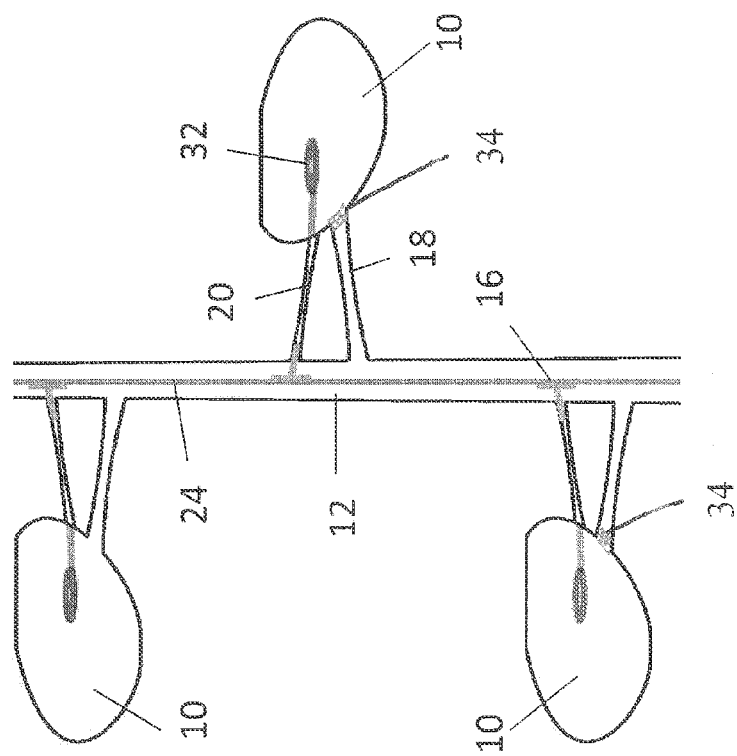
FIG. 5 is a cross-sectional view of three pods according to an alternative embodiment of the invention.
Figure 6:
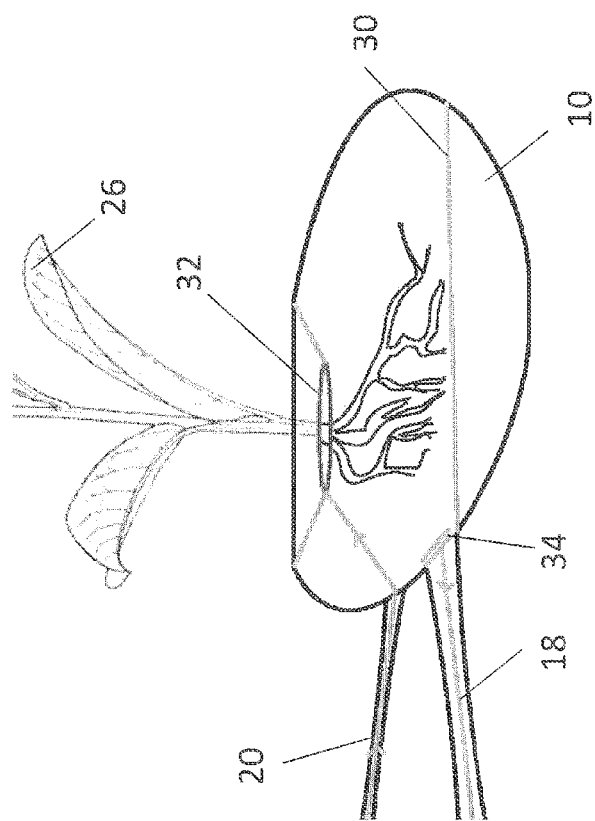
FIG. 6 is a cross-sectional view of one of the pods of FIG. 6, but containing a plant.
Figure 7:
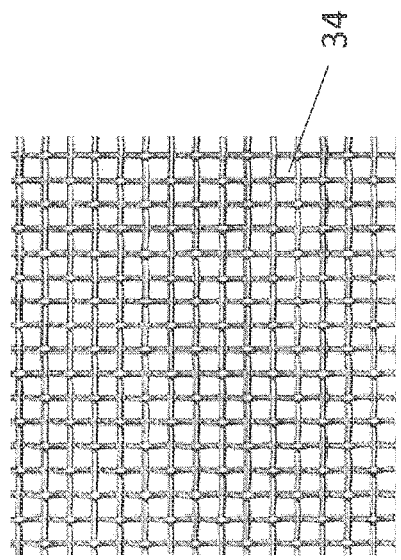
FIG. 7 illustrates a mesh screen used with the embodiments of FIGS. 1 and/or 6 to prevent clogging of the water return lines.

FIGS. 5 and 6 illustrate another embodiment wherein the flow of water into each pod 10 is facilitated by a drip ring control valve 32 that more evenly disperses the water around the base of a plant contained within each pod. In addition, a mesh grate 34 may be placed over the opening into lower support arm 18 to prevent debris such as dirt, hydroponic material, or plant material from entering the interior hollow space of support arm 18 and potentially clogging the flow of water. FIG. 7 illustrates mesh grate 34 in more detail.

Figure 8:
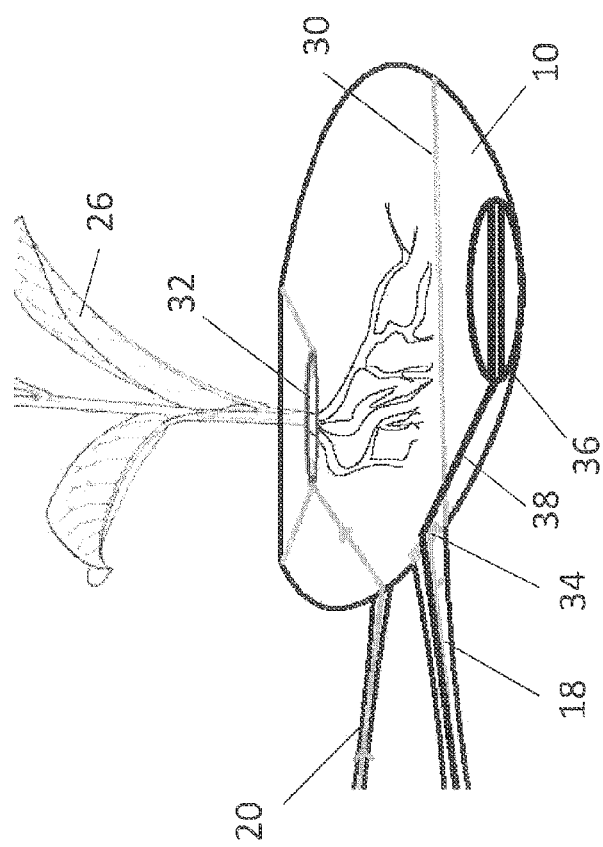
FIG. 8 is a cross-sectional view of a third embodiment of the invention featuring an integrated grow light.

FIG. 8 illustrates a further embodiment of the invention wherein one or more individual pods 10 include an integrated grow light 36 positioned in the bottom interior of the pod. The grow lights 34 will direct their light energy downward to illuminate the plants contained in a pod 10 located below the pod containing grow light 36. The bottom of any pod containing a grow light 36 will have sufficient openings to allow the light to exit pod 10 and shine downward. Angled divider 30 will provide a waterproof partition and seal preventing water from entering into the space occupied by grow light 36, and thereby potentially leaking out through the openings in the bottom surface of the pod 10.

Each grow light 36 is powered via a power cord 38 that extends out through one of the support arms 18 or 20, and down through the interior of the adjacent vertical column 12. The power cords 38 can be powered via a standard power source and switch. Alternatively, the grow lights 34 can be controlled via a programmable controller so that the lights can turn on and off at preprogrammed times to provide optimal light to the plants.

Figure 9:
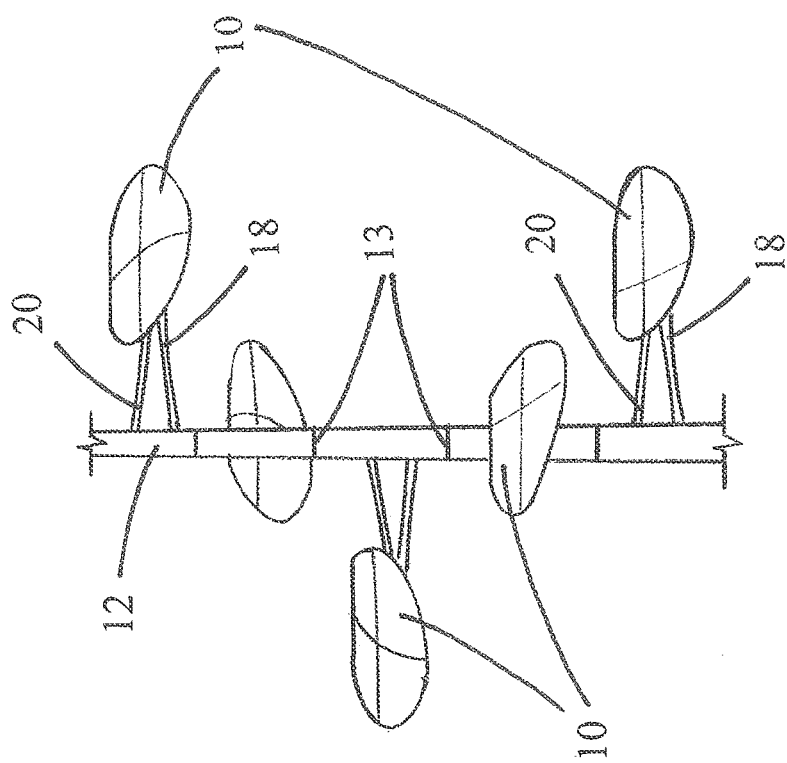
FIG. 9 is a perspective view of a fourth embodiment of the invention featuring rotatable pods.

FIG. 9 illustrates yet another embodiment of the invention wherein the pods 10 may be freely rotated about their respective vertical support members 12 to provide more flexibility in the arrangement of the pods 10. The extension member(s) 18,20 may be physically connected to the upright support with a collar configured and dimensioned to freely rotate around the long axis of the vertical support. The vertical support 12 may also be divided into segments that connect to each other at a joint 13 in a tapered stacking arrangement and interlock with other segments above and/or below the segment to allow rotation between the segments, so the pods 10 may point away from the support 12 in different directions.

Figure 10:
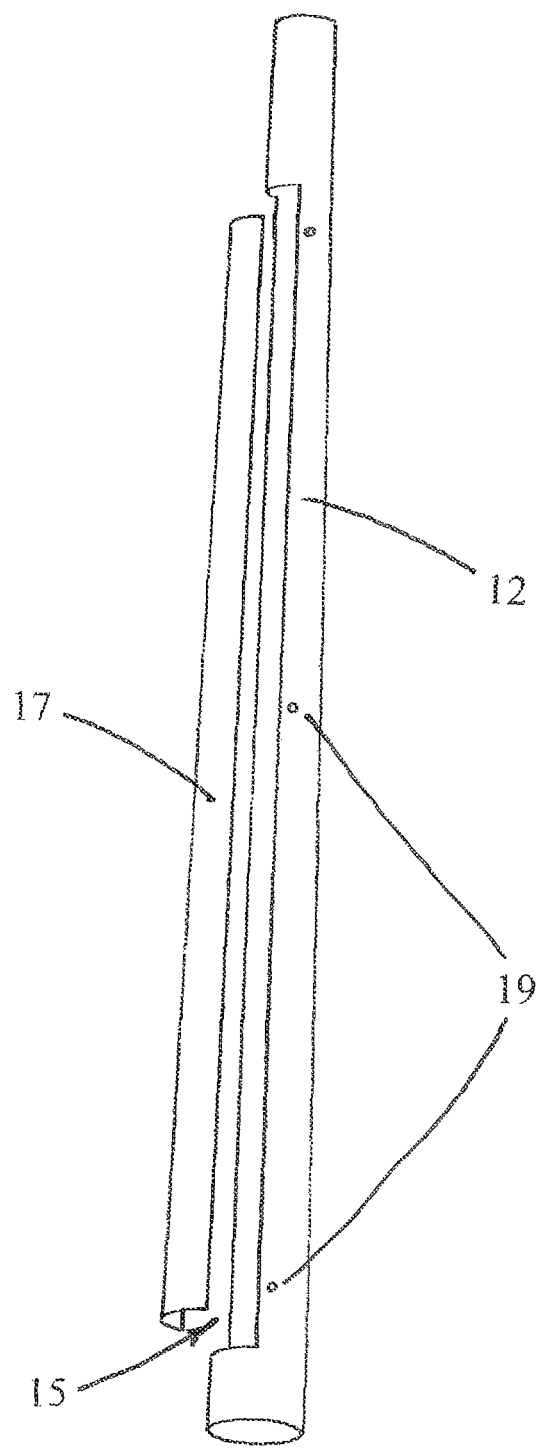
FIG. 10 is a cut-away view showing an upright support with an access door.

FIG. 10 depicts the support door entry 15 and door panel 17 for a reservoir installed within the hollow interior space of an upright support 12. The door opening is configured and dimensioned to allow insertion and removal of the reservoir. Each upright support may have a door panel 17 or access panel that may be attached to the support 12 using, for example, latches, cantilevered snaps, screws or other fasteners known in the art, and can be removed to allow access to the reservoir, pump mechanism, and conduits for filling, repair, and/or replacement. The upright support 12 may have holes or attachment features 19 that correspond to and mate with attachment features on the door panel 17. The support door panel 17 may be located approximately at the base of a support with a section of 1"-5" between the bottom of the support and the lowest edge of the opening to provide rigidity and structural integrity to the bottom portion of the support, particularly when the bottom portion is attached to a base.

Figure 11:
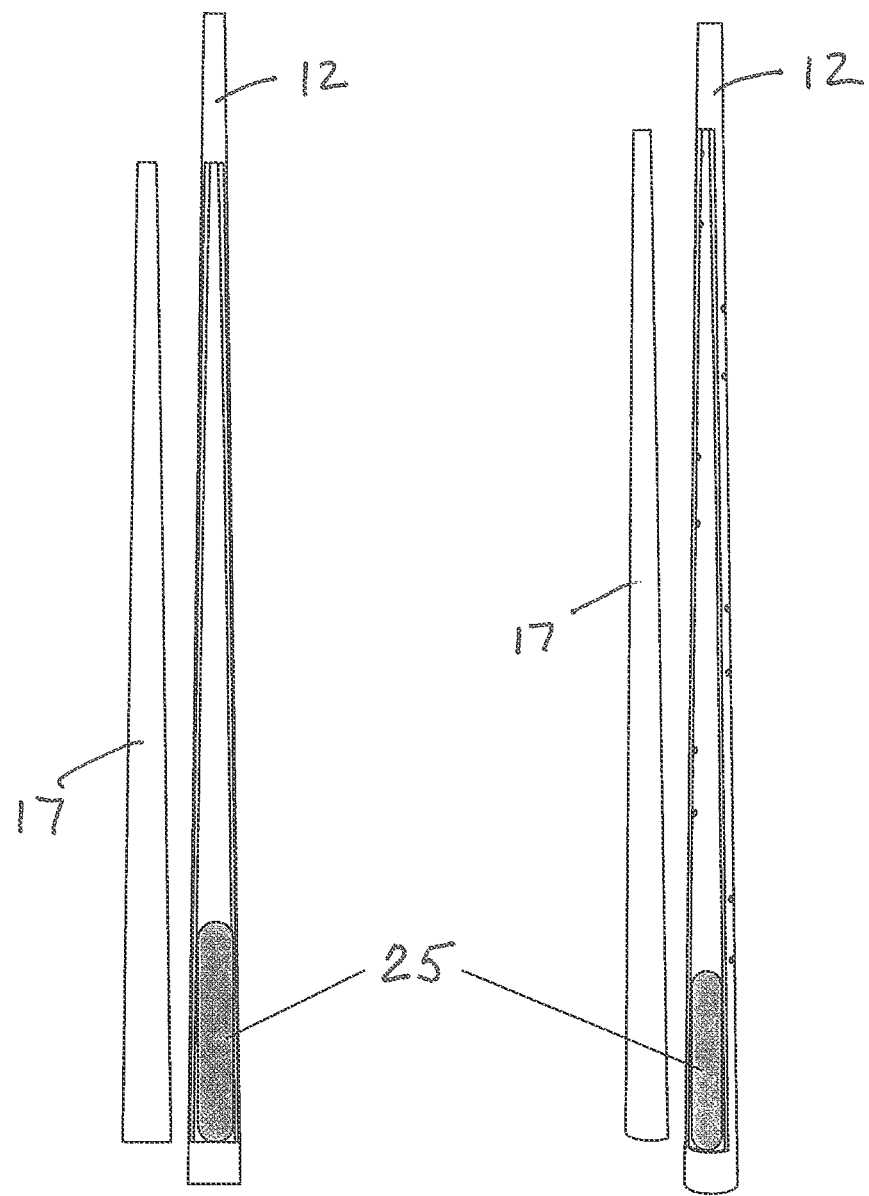
FIG. 11 is a cut-away vie showing a reservoir positioned within the interior space of a support.

FIG. 11 depicts a cut-away view of the interior space of a hollow support 12 containing a liquid reservoir 25 for containing water filled to a particular height. The reservoir may be a clear plastic cylinder configured and dimensioned to be inserted through the access opening and into the 1"-4" inches at the bottom of the support. The opening 15 would be covered by a door panel 17.

FIGS. 12A-D illustrate different views of an embodiment of a drain cup 40 that comprises a disk 42 with an outer rim 43 around its circumference and a drain opening 45 located approximately in the center of the disk 42, wherein the disk's upper surface may slope downward from the outer rim to the opening to funnel liquid to the opening 45 and provide drainage. A screen may be placed within the opening to prevent potting and plant material from dogging the opening. A drain cup support 48 extends outward from the bottom surface of the drainage disk around the opening, and further comprises a conduit 47 that channels liquid entering the opening 45 in the upper disk surface to an opening 49 in the drain support. The opening 49 may be connected to a conduit in an extension arm and/or the upright support to provide fluid communication with a return conduit. The bottom surface of the drainage spout may be configured and dimensioned to position and support the drain cup at a preferred location within a planter. The drainage spout is preferably cylindrical in shape and may have a bottom face that is contoured to match the inner bottom surface of a planter, although other shapes are contemplated and fall within the scope of the invention.

Figure 14A:
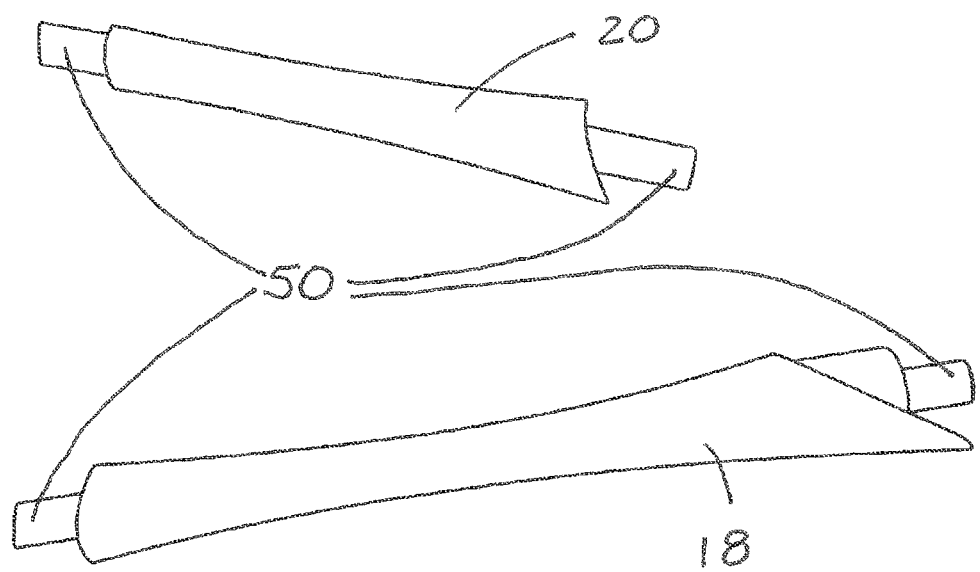
FIGS. 14A-B show side and top views and details of embodiments of the upper and lower support members.
Figure 14B:
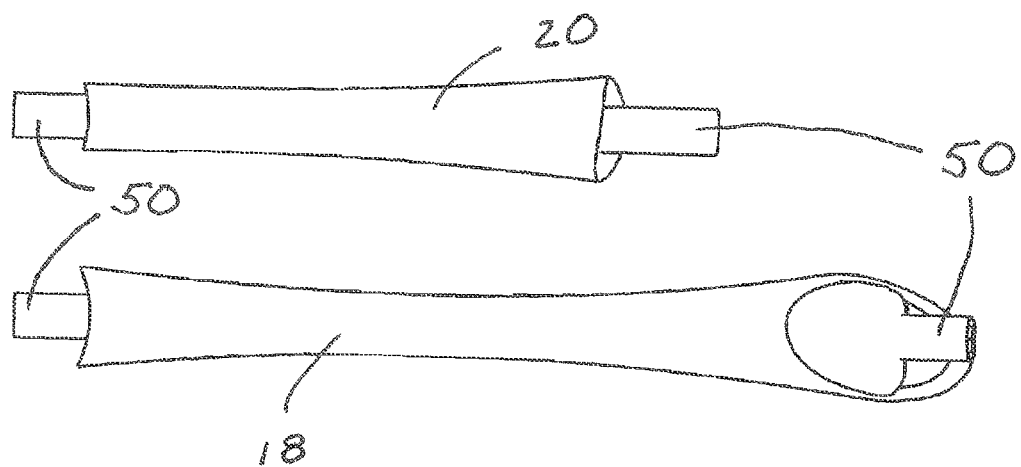

FIG. 13 illustrates an embodiment of a pod 10 and upper support member 20 and lower support member 18. The support members are shown with annular cylinders 50 extending out from each end of the support member that provide sections for attachment of rubber or plastic tubing to the support member. The support members 18, 20 also have shoulder regions 53 against which the surface of the pod and the surface of the upright support can rest. The should sections may be configured and dimensioned to match the curvature of the outer surfaces of the support and pod to provide a smoother and less discernable interface between the parts. The end of the support member intended to be attached to a pod may also have an intermediate cylindrical section 51 with an outer diameter larger than the tubing attachment section, but smaller than the outer diameter of the support member. The intermediate section can be configured and dimension to fit into an opening in the pod, and provide more support than might the smaller tubing attachment section. FIGS. 14A-B show additional views and details of embodiments of the upper and lower support members 18, 20. The annular cylinders 50 are configured and dimensioned to fit within tubing used for the delivery and return conduits, and have channels to allow the support members to carry liquid and interconnect the pod with the conduits so they are all in fluid communication.

Figure 15:
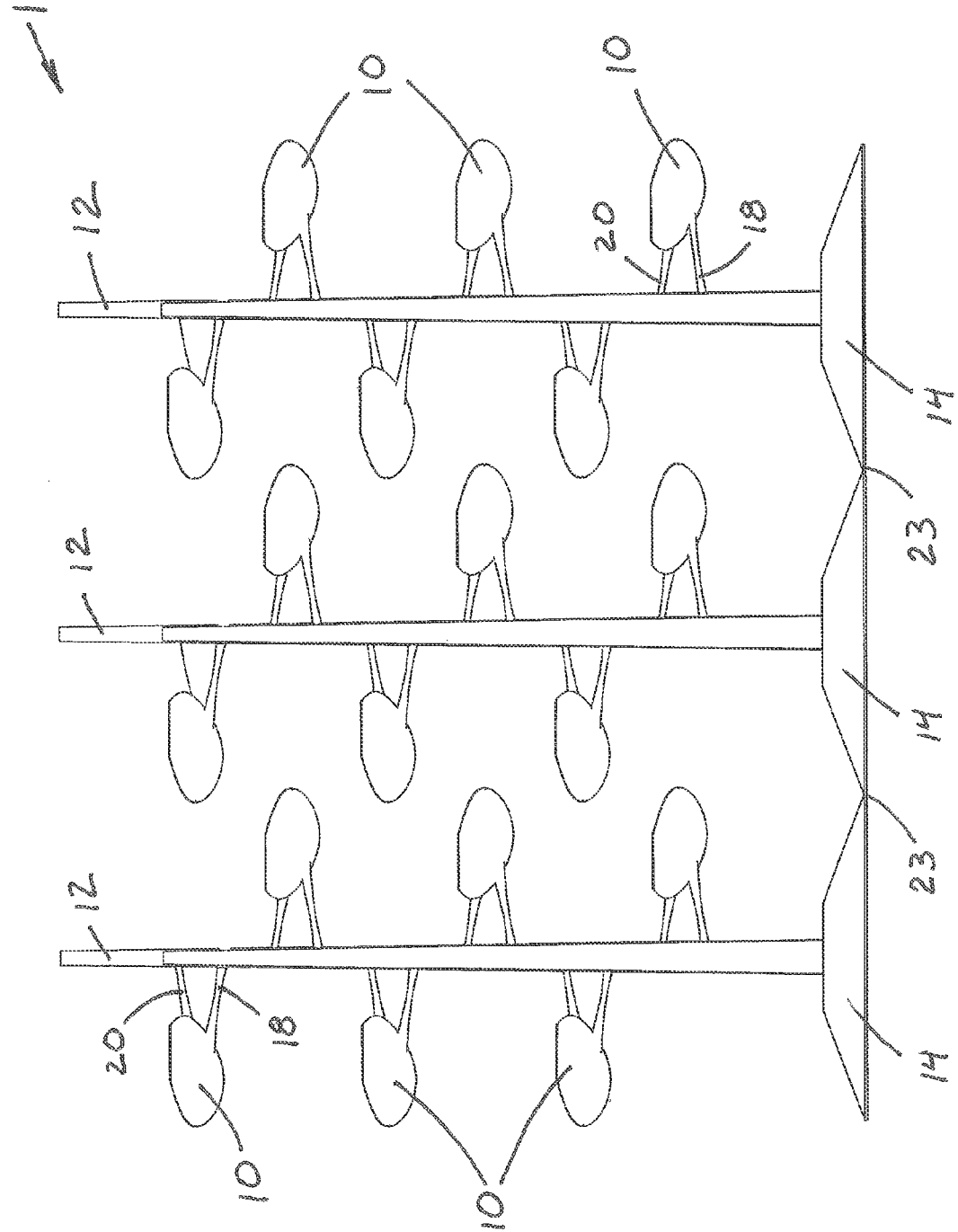
FIG. 15 illustrates a front view of a planter system having three separate bases in accordance with another embodiment of the invention.

FIG. 15 illustrates an embodiment of the invention having separate bases 14 for each of the upright supports 12 of an embodiment of a planter system 1. This allows two or more bases to abut along a mating edge 23. The bases may be arranged in different patters to allow the system to fit in or around corners of a room. The abutting edges may be joined using suitable fasteners known in the art.

Figures 16A, 16B:
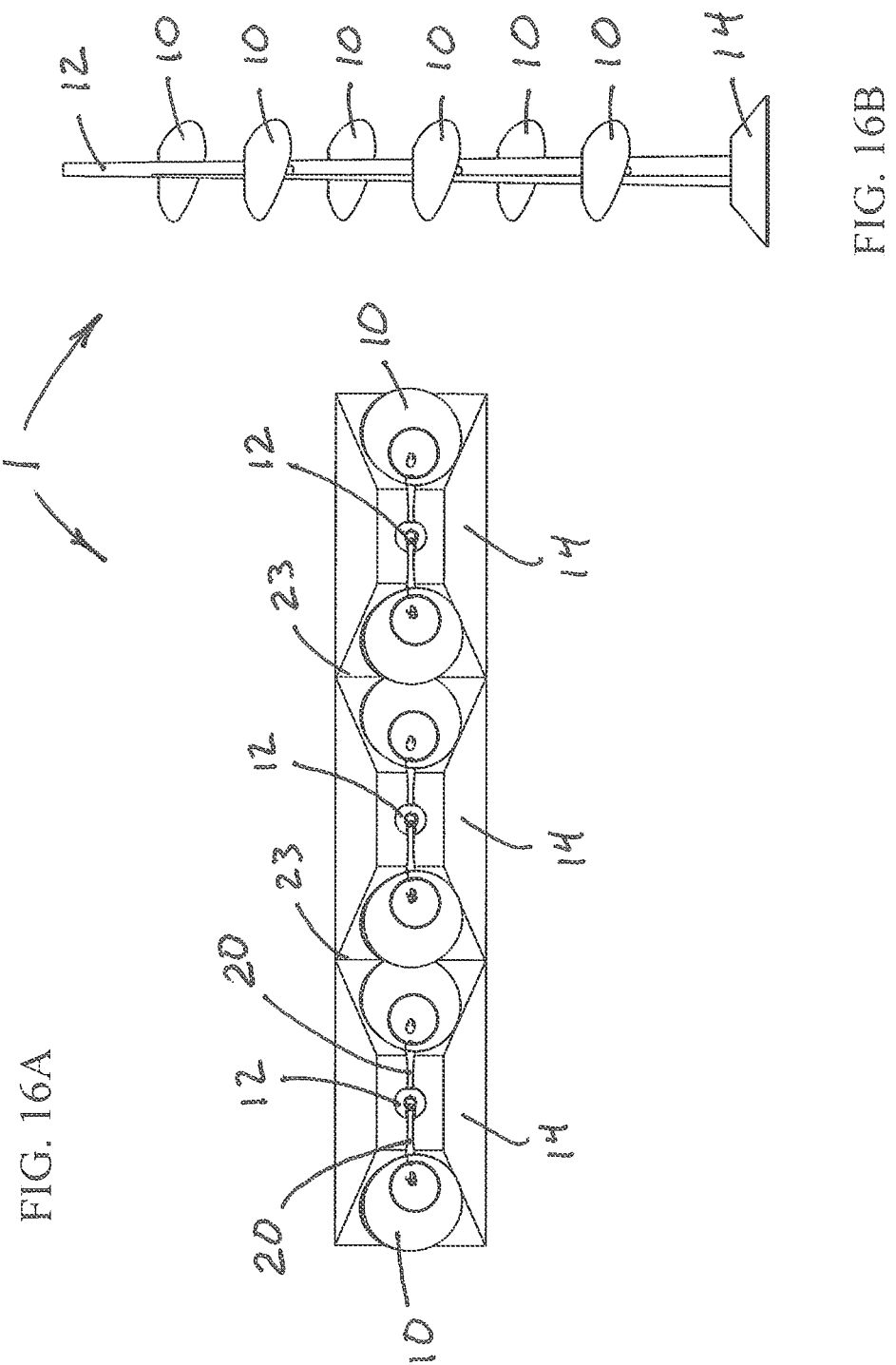
FIGS. 16A-B illustrate a top view and side view of a planter system having three separate bases in accordance with another embodiment of the invention.

FIGS. 16A-B illustrate a top view (FIG. 16A) and side view (FIG. 16B) of a planter system 1 having three separate bases 14 abutting along their edges 23. The top view (FIG. 16A) and side view (FIG. 16B) show the alternating arrangement of the planters 10. In a non-limiting example, the bottom portion of each upright support encases a separate cylindrically shaped water reservoir approximately 3" in diameter and 15" tall, but not limited to these dimensions, an air tube in communication with the air pump enters the water reservoir from the open top and dips down into the closed base of the reservoir, it then again rises and connects to a larger vertical tube which connects with an opening to allow water to enter the air tubes, for example in the manner of a venturi tube to entrain liquid with the air bubbles that then lift the water droplets to circulate water through the system. The air bubble and entrained liquid should be raised to the pod farthest from the reservoir, which would be the highest pod attached to the support.

Figure 17:
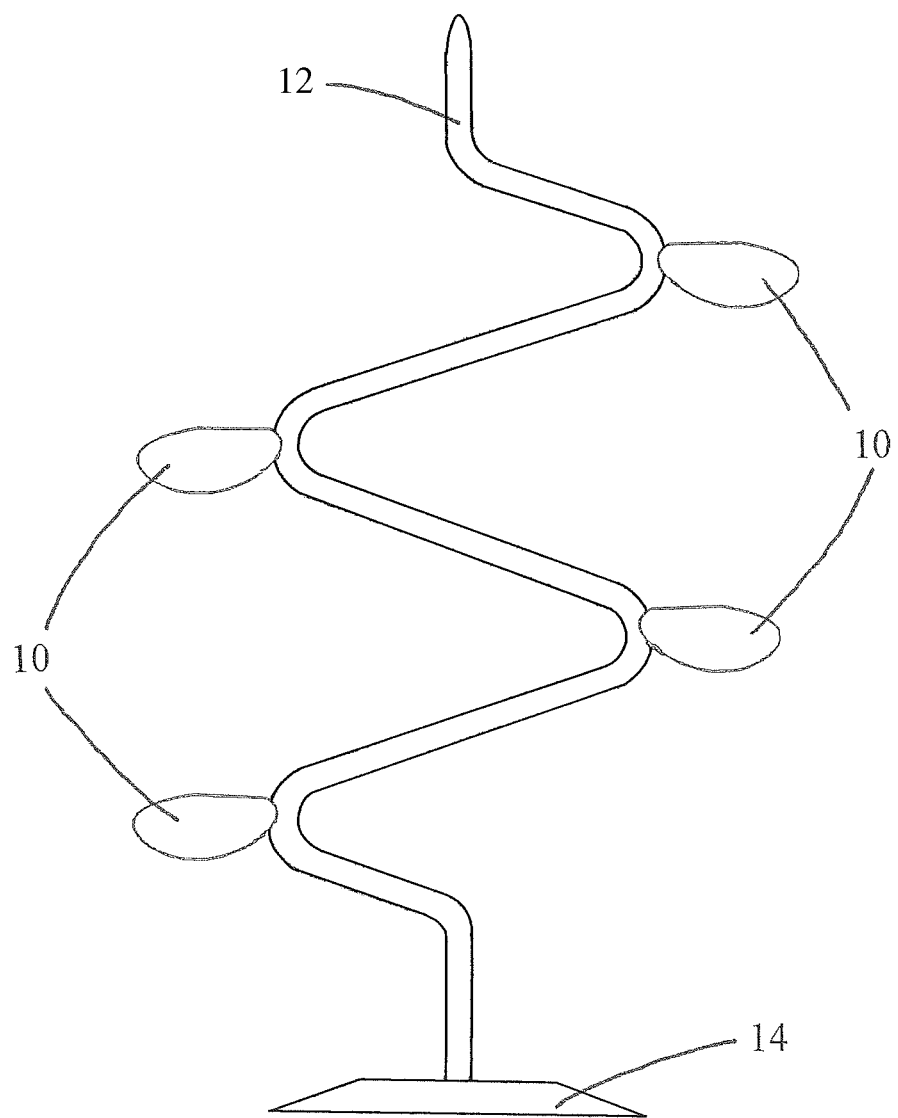
FIG. 17 is a front view of another embodiment of the irrigation system.

FIG. 17 illustrates another embodiment of an irrigation system in which the upright support 12 bends back and forth in opposite directions to form a zigzag arrangement. In this example, the planters are shown to be connected directly to the support without the use of extension members. The planters can be directly coupled to the liquid delivery and return tubing using couplings known in the art, such as barbed or annular snap-ring couplings.

Figure 18:
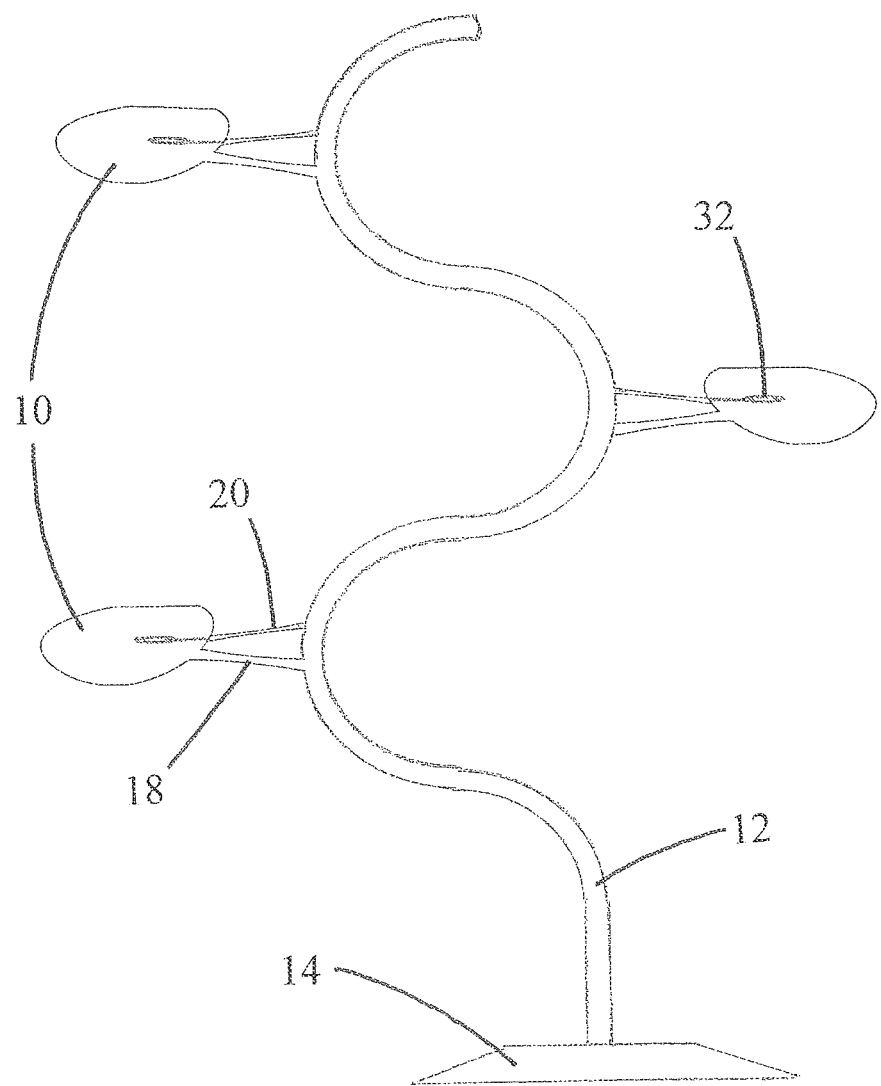
FIG. 18 is a front view of another embodiment of the irrigation system.

FIG. 18 illustrates another embodiment of an irrigation system in which the upright support bends back and forth in opposite directions in smooth curves to form a serpentine shape. The planters 10 are connected to the bending upright support 12 with extension members 18,20, such that the upper extension member 20 can be connected to a liquid-delivery tube (not shown) and the planter can drain excess liquid either into the annular space within the bending support or into a liquid-return tube (not shown). The excess liquid can then return to the reservoir in the base 14 under the force of gravity.

In another example, an upright support has an approximately 3½" diameter at its bottom end, and tapers to approximately a 2" diameter at its top end. An access opening is formed approximately 4" from the bottom in the lower section of the support and extends 15" upwards along the length of a straight section of the support. The opening is formed around approximately 20% to 45% or preferably 33%-40% of the circumference of the support to allow insertion of the reservoir and pump mechanism into the 4" enclosed base of the support. A door covers the access opening and may be attached by snaps, screws, latches, or other fasteners known in the art. Irrigating liquid can be added to the reservoir by removing the door. A tube is connected to a submersible pump that sits on the bottom of the reservoir so that the pump inlet is submerged below the level of the irrigating liquid added to the reservoir when in use. The tubing is ⅜" diameter plastic tubing that runs along the inside of the upright support to the highest connection point on the support. The tubing is connected to an upper support member inserted into the upper opening at the highest connection point by a push fit onto an annular tube projecting into the interior of the upright support. The annular tube at the opposite end of the upper support member is inserted into an opening in the side wall of a pod and connected to an opening in a drain cup by a push fit. This places the pod and drain cup in fluid communication with the pump and reservoir. A tube connects the outlet of the drain cup to the annular tube of the lower support member. The opposite end of the lower support member enters the upright support at the lower opening of the connection point and places the lower support member in fluid communication with a ⅜" tube acting as the return conduit. The ⅜" return conduit is connected to the upper support member of the next tower pod, which is connected to and in fluid communication with the drain cup and lower support member. In this manner each higher pod is connected to the next lower pod to feed excess irrigating liquid to each pod in series under the force of gravity until the irrigating liquid reaches the lowest pod. The lower support member of the lowest pod is connected to a ⅜" tube that extends to the bottom of the reservoir to allow excess irrigating liquid to return to the reservoir and be recirculated by the pump back to the highest pod. This forms a closed circuit for delivering irrigating liquid to the plants in each attached pod.

It is to be understood that some or all of the above described features, components and method steps can be combined in different ways, and variations and modifications other than those illustrated will be apparent to persons of ordinary skill in the art. In particular, the invention may be implemented with other choices of shapes, cross-sections, or materials, according to the criteria stated above. Each and every such possible permutation and combination is separately deemed to be an embodiment herein in its own right. It is therefore intended that all of these embodiments, examples, variations and modifications thereon are meant to be encompassed within the spirit and scope of the present invention as set forth in the following claims.

This application also expressly incorporates by reference U.S. Provisional Application 61/586,522, filed Jan. 13, 2012, in its entirety for all purposes.

What is claimed is:

1. A planter system comprising:
an elongated upright support member having one end positioned on a horizontal surface;
a plurality of individual planters, wherein each planter is attached to the upright support member via an upper hollow support bar and a lower hollow support bar, each said upper support bar being angled downwardly from the upright support member toward its respective planter, and each said lower hollow support bar being angled upwardly from said upright support member toward its respective planter;
a first fluid delivery conduit connected between an upper hollow support bar located farthest from said horizontal surface and a fluid reservoir, wherein the fluid delivery conduit is in fluid communication with the fluid reservoir and the upper hollow support bar;

a plurality of fluid return conduits, wherein each fluid return conduit connects a lower hollow support bar of a higher planter to an upper hollow support bar of a next lower planter, and provides fluid communication from an outlet of the higher planter to an inlet of the lower planter;

a pump mechanism connected to the first fluid delivery conduit to deliver fluid from the reservoir through the fluid delivery conduit to the upper support bar located farthest from the horizontal surface, wherein fluid will flow from each higher planter through its respective lower support bar and fluid return conduit, and into the next lower planter through an upper support bar until it exits a lowest planter and returns to the reservoir, such that fluid will flow through each of the planters under gravity.

2. The planter system of claim 1 which further comprises a base support comprising said horizontal surface, wherein the elongated upright support member is affixed at one end to said base support.

3. The planter system of claim 1, wherein the pump mechanism is a liquid pump or an air pump.

4. The planter system of claim 2, wherein said base support comprises a hollow internal volume containing said fluid reservoir.

5. The planter system of claim 1, wherein each planter is a pod having a spherical, ellipsoid, or ovoid shape.

6. The planter system claim 1, wherein each said planter comprises a shell defining a three-dimensional space, an opening in an upper surface of the shell, and an internal volume that is configured and dimensioned to contain living plants.

7. The planter system of claim 6, wherein each planter further comprises a drain cup located within the shell of the planter that is in fluid communication with the upper hollow support bar and the lower hollow support bar, such that liquid can be delivered to a living plant within the each drain cup located in each planter.

8. The planter system of claim 7, wherein hydroponic materials are placed within an internal volume of the drain cup.

9. The planter system of claim 6, wherein the planters are cantilevered away from the upright support member.

10. The planter system of claim 1, wherein each upper hollow support bar and each lower hollow support bar are physically connected to the upright support member by a collar configured and dimensioned to freely rotate around the long axis of the upright support member, thus permitting rotation of the planters around the axis of the upright support member.

11. The planter system of claim 6, wherein each planter further comprises a second opening in a lower surface of the shell and a partition that divides the internal volume into an upper section that is accessible by the opening in the upper surface, and a lower section that is accessible by the opening in the lower surface, such that the upper and lower sections are isolated from each other, and a light fixture mounted within the lower section that can illuminate a planter located below the lower opening.

12. The planter system of claim 1, wherein the upright support member is a straight vertical column.

13. The planter system of claim 12, wherein the straight, vertical column tapers from a larger diameter at said one end positioned on said horizontal surface to a smaller diameter at an end opposite to said one end.

14. The planter system of claim 1, wherein said fluid delivery conduit comprises tubing running along an interior of said upright support member.

15. The planter system of claim 1, wherein the upright support member comprises a hollow tube that is partitioned internally into a liquid-delivery conduit and a liquid-return conduit, and wherein the pump mechanism generates enough pressure to propel water within the liquid-delivery conduit at least to a height necessary to deliver a liquid to a highest planter in liquid communication with the liquid-delivery conduit.

16. The planter system of claim 15, wherein the liquid-delivery conduit comprises tubing, and the liquid-return conduit comprises a series of separate return tubing sections, each of which places an outlet of a higher planter in fluid communication with an inlet of a next lower planter.

17. The planter system of claim 1, wherein the upright support member bends in alternate directions to form a zigzag pattern, and wherein the planters are physically connected to the upright support member at the vertices of each bend.

* * * * *